United States Patent [19]

Pierce

[11] 4,165,408

[45] Aug. 21, 1979

[54] CARDBOARD PICTURE MAT WITH COLORED SURFACE AREAS

[76] Inventor: Donald C. Pierce, 59 Reposa Vista, Novato, Calif. 94947

[21] Appl. No.: 881,028

[22] Filed: Feb. 24, 1978

Related U.S. Application Data

[60] Continuation of Ser. No. 760,356, Jan. 19, 1977, abandoned, which is a division of Ser. No. 588,965, Jun. 20, 1975, Pat. No. 4,025,666.

[51] Int. Cl.[2] .......... B32B 9/06

[52] U.S. Cl. .......... 428/452; 428/454; 428/543; 428/532; 428/511; 427/197; 427/212; 156/59; 156/62; 40/158 R

[58] Field of Search .......... 428/411, 511, 452, 543, 428/532, 446, 454; 427/197, 212; 156/59, 62

[56] References Cited

U.S. PATENT DOCUMENTS

| | | | |
|---|---|---|---|
| 1,903,813 | 4/1933 | Glenn | 428/446 |
| 3,287,193 | 11/1966 | Klein | 428/161 X |

FOREIGN PATENT DOCUMENTS

| | | | |
|---|---|---|---|
| 51-70236 | 6/1976 | Japan | 427/197 |
| 1142498 | 2/1969 | United Kingdom | 156/59 |

*Primary Examiner*—P. C. Ives
*Attorney, Agent, or Firm*—Owen, Wickersham & Erickson

[57] ABSTRACT

A method for decorating the border panel or any other area of a cardboard picture mat and the product of that method. Boundary lines of ink or other material are drawn to give a desired pattern and to define design areas. Then a finely divided pigmented powder is brushed into the areas which are desired to be colored. The paper surface holds only a limited amount of the powder, and excess powder is removed. The areas may be rubbed down to assure even distribution and to impart a desired brilliance or tone.

6 Claims, 6 Drawing Figures

FIG. 1
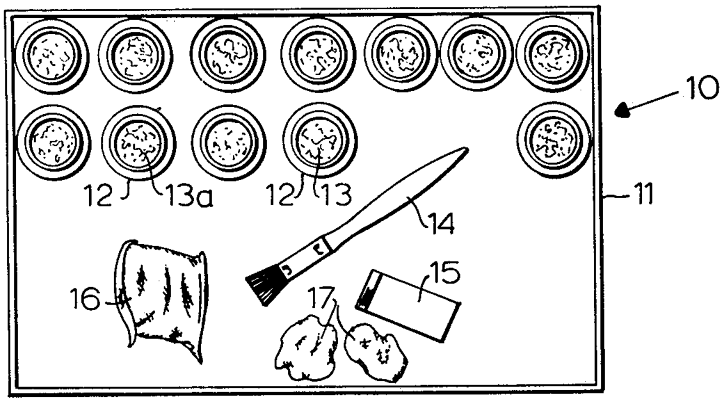
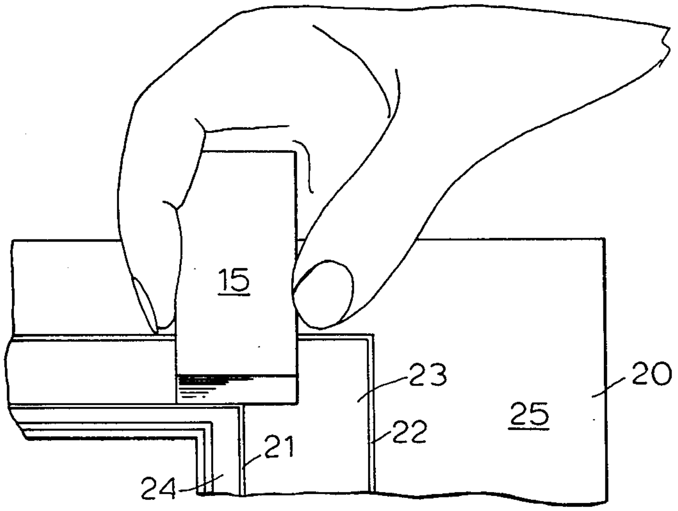
FIG. 2
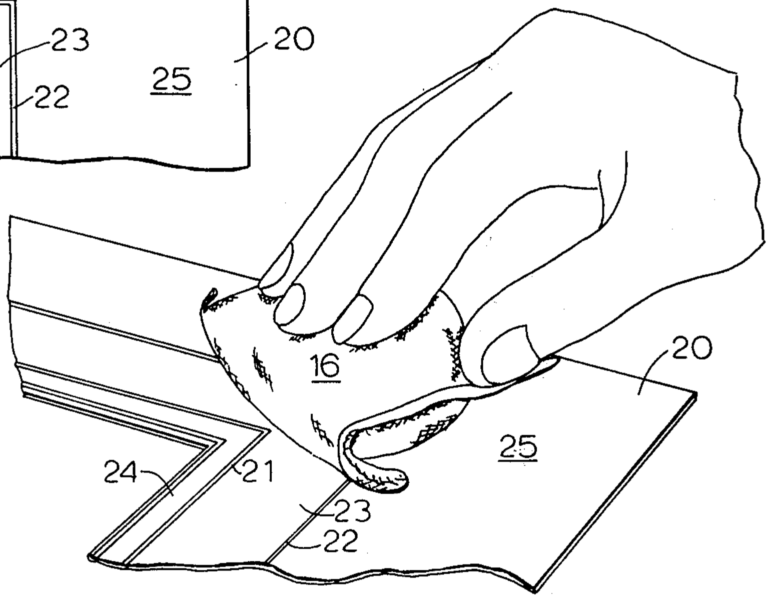
FIG. 3

CARDBOARD PICTURE MAT WITH COLORED SURFACE AREAS

CROSS REFERENCE TO RELATED APPLICATIONS

This application is a continuation of application Ser. No. 760,356 filed Jan. 19, 1977 now abandoned, which was a division of application Ser. No. 588,965 filed June 20, 1975, now U.S. Pat. No. 4,025,666, issued May 24, 1977.

BACKGROUND OF THE INVENTION

This invention relates to cardboard picture mats with tinted areas and to a method of tinting those areas. Such mats are often called French mats in the United States and are often called wash-line mounts in England. The invention also relates to other art methods where a coloring effect resembling watercolor is desired without using water.

Cardboard picture mats are used for mounting various types of graphic art including watercolor paintings, lithographic and other prints, etchings, engravings, photographs, and so on. Mat boards are available in many colors, yet it is often desirable to use a color which the suppliers and framers do not have in stock. Moreover, it is often desirable to have more than one color on a particular mat, and such plural-color mats are not carried in stock but have to be made individually.

In some instances, the artists, framers, or studio technicians will seek to vary the mats by applying watercolor paints to them. This is a very difficult job to do with perfect evenness, and it must always be done carefully, and it is especially difficult when the idea is to apply the color only to certain delimited areas. The paint is likely to overrun the border, it is likely to streak, and few people are possessed with the needed technical ability and steadiness to perform the task. Moreover, the water has a tendency to warp the mat, distort it from true flatness, or even to cause separation of the laminations. Watercolor, once applied, cannot be removed. Also, application of watercolors is affected by temperature and humidity.

The present invention makes it much easier to perform such a task and to avoid streaking, warping, separation of laminations, and so on. An object of the invention is to enable the preparation of cardboard picture mats with various colors applied to chosen areas thereof and to make this job one that does not require great skill and which most people are able to perform with relative ease.

Another object of the invention is to enable a wide variety of such colors to be applied without difficulty.

Another object is to provide mats where the colors do not fade.

Another object is to enable changes in the applied tone after its application and to enable erasure and reapplication.

Another object is to provide a new technique of wide applicability for the application of color areas not only to mats but also to paper and other suitable base materials.

SUMMARY OF THE INVENTION

The method of the invention embodies first defining the areas to be tinted, including, if necessary, drawing ink (or other) lines to define the areas. In some instances, an entire mat surface will be tinted, and in that instance no lines need be drawn.

Once the area to be tinted has been determined, then the operator brushes into these desired areas a finely divided dry powder having a desired hue and saturation. This is preferably made from a mixture of a finely divided pigment or pigments and a whitener, also in finely divided form. The mixture is applied dry, preferably with a brush, such as a watercolor brush, or with a cotton wad or something else that does not distrub the mat surface. After this application, the operator rubs down the surface (as with cotton swabs) to achieve a desired brilliance or tone. When done on a white stock, the brilliance can be carefully controlled by this manner and still a great evenness of distribution obtained.

An important factor in the sureness and desirability of this invention is that mat board and other paper can take and hold only so much of the dry colored material; as a result, the eventual evenness of the application is, in substance, built into the paper or board—an inherent quality of the surface.

Thus, in contrast to the application of watercolors, there is no re-working of an area to build up color. An excess of dry power is applied by the brush and worked into the surface by the brush. Then, the excess is removed, and the rubbing-down perfects the evenness of the color. If the operator believes that the resultant colored surface has too much color or tone, he can evenly remove some by using a dry cleaning pad to achieve light erasure in an even manner. Or he can erase more thoroughly and re-apply some color.

The completed product is that of a mat (or other paper surface ) having on desired areas a coating of finely divided powder having a desired hue, saturation, and brilliance. After the rubbing-down operation, this material will not smudge and will not come off on one's hands. It can be said to have substantial permanence. It will not fade, when the preferred pigments are used. Yet, it can be erased or reworked if changes are desired.

Other objects and advantages of the invention will appear from the following description of a preferred embodiment.

BRIEF DESCRIPTION OF THE DRAWINGS

In the drawings:

FIG. 1 is a top plan view of a kit embodying the principles of the invention.

FIG. 2 is a fragmentary view in perspective of the step of erasing a mount board according to the method of the invention.

FIG. 3 is a similar view showing use of a dry cleaning pad on the mount board.

DESCRIPTION OF A PREFERRED EMBODIMENT

Figure 4:
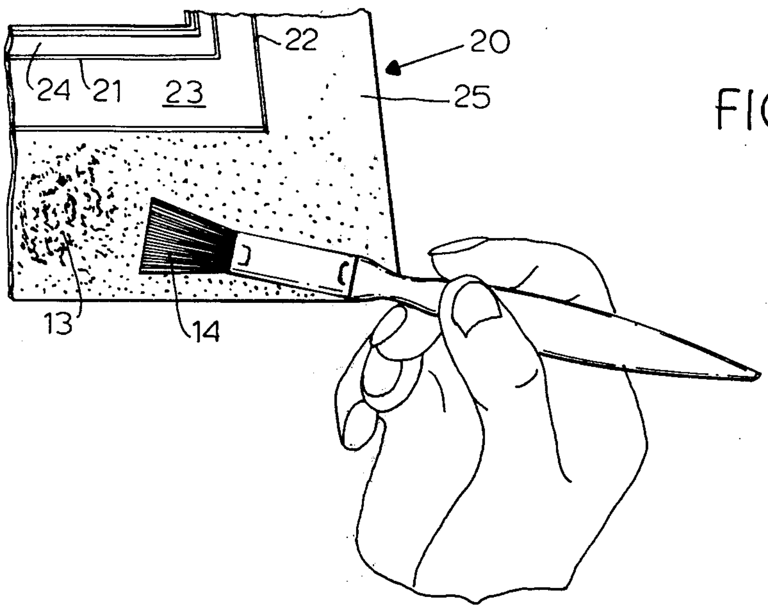
FIG. 4 is a similar view showing application of the powder.

The invention utilizes mats or papers which, in general, are best handled when they are light in hue, such as white, off-white, ivory, grey, beige, or some other light tone; the use of a light shade in the main stock gives more flexibility than where a dark stock is used. No preparation need be given the paper except that it be clean and free from grease spots. It is usually best to use it in a mint condition and to avoid handling it with the fingers prior to application of the material or at any other time, for that matter, in order that the inherent uniformity of powder acceptance be preserved.

The material to be used comprises a mixture of a pigment, preferably inorganic, in finely divided form and a whitener or hue-lightener, also in finely divided form. Pure pigment is always too strong and too raw, and usually the mixture comprises far more whitener than pigment. The whitener also acts somewhat like a vehicle or pigment-carrying medium to carry the pigment evenly to the surface to be coated. A complete color wheel of products can be produced by a manufacturer, and the material may conveniently be sold as a kit comprising a series of containers for the powdered pigmented material, suitable applicators, rubbing-down materials, and erasers.

It is very important that the pigments and the whitener (or pigment extender) be well mixed together, to assure complete uniformity, and that they be in finely divided form, with the pigment particles predominantly (typically 90%) in the range of 0.1–5 microns and the particles of pigment extender or whitener predominantly (typically 90%) in the range of 1–10 microns.

Typical pigments that may be used are iron oxides, chromium oxides, ultramarine, and carbon black. Metallic, nacreous, pearlescent, and luminescent pigments may also be used.

Typical whiteners, which are preferably inorganic, are calcium carbonate, silica, silicates of aluminum, calcium and magnesium, the sulfates of barium and calcium diatomaceous calcite, pumice, and tripoli.

The materials may be natural or synthetic, but are preferably inorganic. It is possible, in some instances to use organic pigments, but they sometimes have undesired qualities, such as less resistance to fading. A complete color-wheel assortment of the desired type can be made by using a combination of a natural carbonate, a natural silicate, and the various iron oxides, chromium oxides, and ultramarine blue, along with carbon black, to decrease the brilliance. The mixture is preferably not completely opaque, so that the color can, in effect, create a transparent coating.

The materials must be very thoroughly and completely mixed, in order to avoid streaking. While two or more of the prepared colors can be mixed to produce additional or intermediate shades, still one should endeavor to have a uniform mixture in needed amount ready before coloring any desired area. In this invention the uniformity so generally desired is achieved by the following major factors: (1) the uniformity of powder acceptance of the paper to which the powder is applied, (2) the uniformity of the dry powder comprising the pigment and the whitener, (3) application and brushing in of an excess of the powder on the paper surface, followed by removal of the excess, and (4) lightening an area, where desired, by gentle, uniform erasure. When the mixture is properly made and properly applied, the results resemble a watercolor wash or transparency, but the mat surface is free from streaking. The effect of a high quality watercolor wash can be duplicated without using any water.

Application preferably begins after the areas to be colored have been determined. The total surface may be treated, or areas to be treated may be delimited by ink or other lines. Application is done dry, preferably using a soft brush, such as a camel's-hair brush, preferably having a broad tip. In any event, the applicator is chosen to be a material that does not disturb the mat surface. The user carefully follows the lines, applying his pigment mixture to the area on one side of each line within the area and then filling in the central portion. After the area has been generally filled in, the material being generously applied, then excess is removed, and the area is rubbed down or buffed, as with cotton swabs, to accomplish at least three things, (1) to obtain absolute evenness, and this is easily done, (2) to obtain the desired briliance, which involves evenly removing excess pigment down to the desired brilliance, and (3) to render the product smudge-proof. This is done by removing all material which has not worked into the surface, and all three of these actions are done simultaneously.

The finished product is a cardboard mat having, in the desired areas, the desired color, all of which is dry material worked into the surface of the mat and rendered smudge-proof.

A specific example of the invention will now be described with reference to the drawings.

FIG. 1 shows a kit 10, as an example of the kit of the invention. Many variations may be made in the kit 10, but, basically, it should include the following elements, preferably in a single container 11: (1) a plurality (usually) of jars 12 (or other suitable containers), each containing pigmented powder 13 of the invention; there may be as many colors and tints as desired, from one up to one or more complete color wheels; (2) a soft brush 14 (preferably about one-half inch wide and preferably camel's hair or red sable) for application and smoothing of the pigmented powder 13; (3) a soft pencil eraser 15, and (4) a dry cleaning pad 16. These pads 16 comprise an open-knit cloth bag containing ground pencil eraser particles. In contrast to the pencil eraser 15, the pad 16 slows down the erasing action and gives more control of evenness of removal, as will be explained. Preferably, there are also a plurality of swabs 17, such as cotton balls, though these may be obtained separately, if desired. Ruling pens and ink, straight edges, pencils, etc., are usually not in such a kit, being so available and usually on hand for people in this line of work. Mounting boards are also generally obtained separately, as are other framing supplies.

Preliminary steps in the method include cutting the board to size and applying ink lines where desired. FIG. 2 shows one corner of a mounting board 20 having two pairs of ink lines 21 and 22. Between the inner lines 21 and the outer lines 22 is an area 23 that is to be colored according to this invention. The area 23 will, here, lie between an inner margin 24 that is not colored and an outer margin 25, which is to be colored with a different color. Pencil lines used as guide lines for the lines 21 and 22 are erased with the pencil eraser 15 (FIG. 2), and then the entire mat 20 is cleaned with the pad 16 (FIG. 3). Having a clean mat 20 is quite important.

Figure 5:
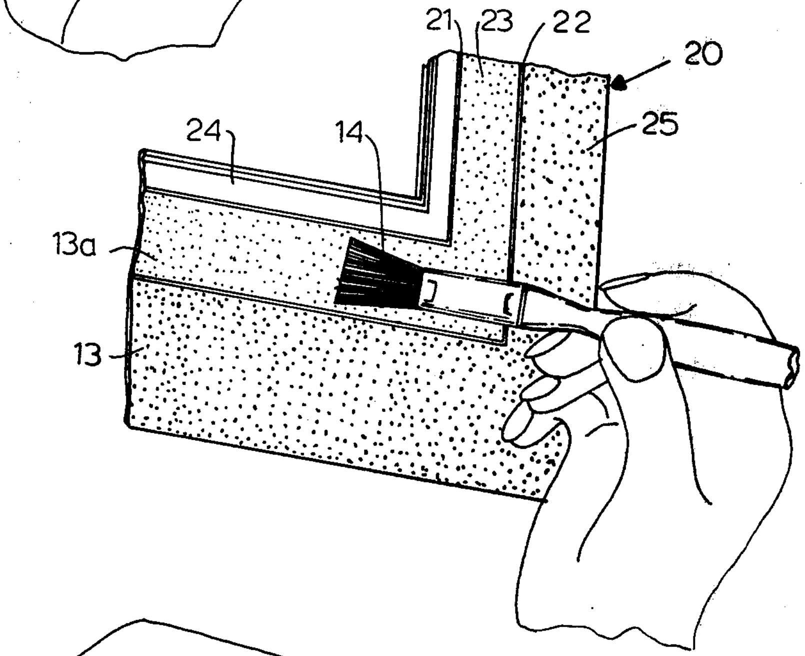
FIG. 5 is a similar view showing the step of smoothing the applied powder.
Figure 6:
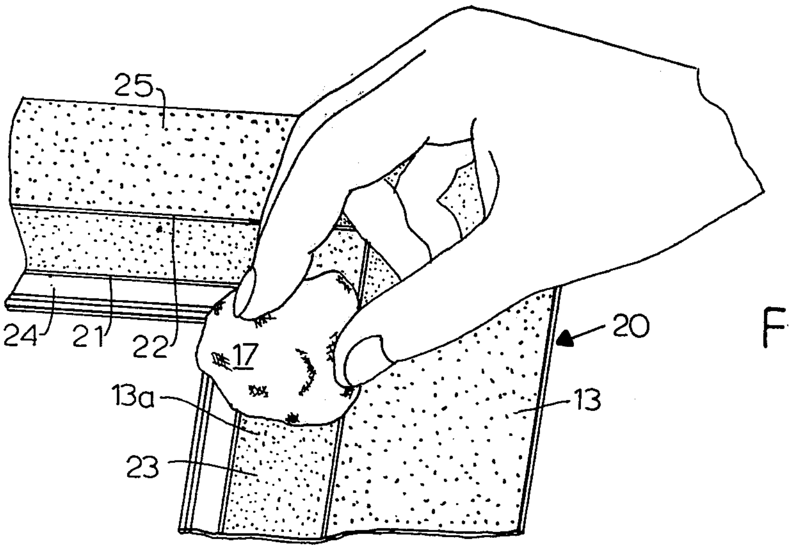
FIG. 6 is a similar view showing the step of buffing with a cotton swab.

The first step after preparation of the mat 20 is application of the pigmented powder 13. This is shown in FIG. 4, where powder 13 is being brushed on to the area 25 with a camel's-hair brush 14. The dry powder 13 from a jar 12 is applied liberally with the soft, broad-end brush 14, avoiding application across the lines 22. A different pigmented powder 13*a* is then applied to the area 23 in a similar manner, limiting application to the area between the lines 21 and 22. If some powder 13*a* does go beyond the boundary lines 21,22 it can be erased later; however, the operator tries carefully to work to the lines 21 and 22, and as additional pigmented powder 13 or 13*a* is needed for either area 24 or 25, he dips the brush 14 into the appropriate jar 12. After completion of this liberal application, the operator blows off excess powder 13 or 13*a*, and as shown in FIG. 5 brushes the powder till it is a smooth, substantially uniform application.

Then, taking a cotton swab 17, the operator buffs each area 23,25, preferably using a different swab 17 for each area. Since the paper surface of each area 23,25 refuses to accept more than a certain amount of powder 13 or 13*a*, and since the surface of good mats is uniform, there is no difficulty in obtaining the desired uniformity. An area may be lightened uniformly, if desired by rubbing it evenly with the pad 16 (as in FIG. 3).

Edges are cleaned with the eraser 15, as in FIG. 2. Mistakes may be erased at any stage. If an area is too dark, it may be erased and the powder 13 reapplied, brushing it to be even and then buffing again. If an area is too light, more material may be applied, again brushing it out till it is even. If the shade is too light, the mat 20 may be erased and a darker shade applied.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A picture mat for mounting pictures, including in combination:

a mat board of cardboard or paper having a dry surface free from adhesives and which accepts and retains finely divided powder, free from liquid medium, up to an amount which fills said surface, and a finely divided pigmented dry powder, different in color from said surface worked into a chosen area of said surface, filling and retained by said surface, said powder being free from liquid medium, residue of liquid medium, and adhesives, each particle of said dry powder filling said surface being in contact therewith and being non-smudgeable.

2. The mat of claim 1 wherein said powder is uniform as to color saturation, hue, and brilliance, and consists of a pigment plus a whitener.

3. A French mat for mounting pictures, including in combination:

a mat board of cardboard or paper having a cut-out through opening and marginal portion surrounding said through opening, said marginal portion having a dry surface free from adhesives and capable of accepting and retaining finely divided powder up to an amount which fills said surface, a plurality of ink lines on said surface spaced from each other, a surface portion between said ink lines, and a finely divided pigmented dry powder, consisting solely of a mixture of colored pigment and a whitener, filling and retained by said surface portion, each particle of said dry powder filling said surface being in direct contact therewith and being non-smudgeable.

4. The French mat of claim 3 wherein said ink lines surround said through opening.

5. The French mat of claim 3 wherein said lines are parallel to each other and to the edge of said opening.

6. The French mat of claim 3 wherein there are at least three said ink lines defining at least two said surface portions, and a plurality of said powders, differing in color from each other.

* * * * *